C. S. EATON.
BELT FASTENER.
APPLICATION FILED AUG. 28, 1912.
1,106,790.
Patented Aug. 11, 1914.
Fig. 1.
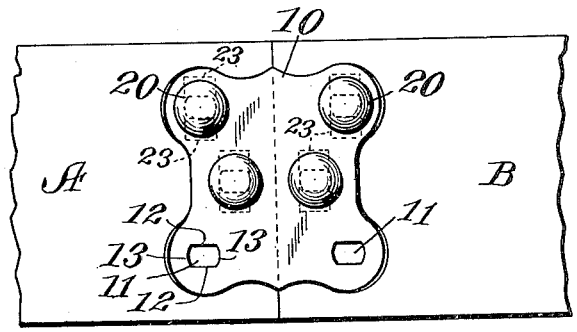
Fig. 2. Fig. 3.
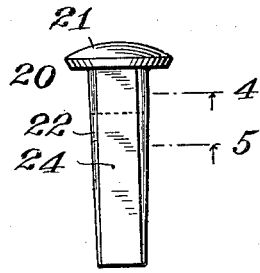 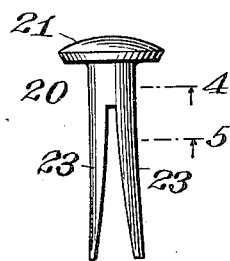
Fig. 4.
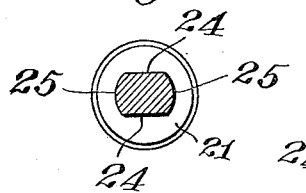
Fig. 5.
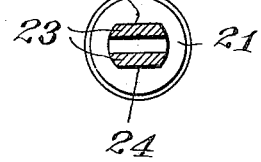
WITNESSES
Frank Eufemia
Agnes C. O'Donnell.
INVENTOR
C. S. Eaton
BY
ATTORNEY
THE NORRIS PETERS CO., WASHINGTON, D. C.

UNITED STATES PATENT OFFICE.

CLARA S. EATON, OF NEW YORK, N. Y.

BELT-FASTENER.

1,106,790.

Specification of Letters Patent. Patented Aug. 11, 1914.

Application filed August 28, 1912. Serial No. 717,416.

*To all whom it may concern:*

Be it known that I, CLARA S. EATON, a citizen of the United States, and a resident of the borough of Manhattan, city and State of New York, have invented certain new and useful Improvements in Belt-Fasteners, of which the following is a specification.

This invention relates to belt fasteners of that class in which a metallic plate is placed across the abutting ends of a belt and the plate is provided with openings through which bifucated rivets extend, the legs of the rivets being clenched on the under side of the belt to secure the ends of the belt together.

One of the objects of the invention is to provide in the plate openings of such shape that only a special form of rivet can be used therewith, and another object is to so form the said openings and rivets that the prongs of the rivets will bind against opposite sides of the openings and said prongs will lie transversely of the belt. Other objects will appear from the hereinafter description.

The novel features of the invention will be understood from the following description taken in connection with the accompanying drawing.

Referring to the drawing, in which the same reference character indicates the same part in the several views: Figure 1 is a plan view showing the meeting ends of the belt connected by the improved plate and rivets, certain of the rivets being omitted to more clearly show the contour of the openings in the plate. Fig. 2 is a side elevation on an enlarged scale of one of the rivets. Fig. 3 is another view looking at right angles to Fig. 2. Fig. 4 is a cross section on line 4 of Figs. 2 and 3. Fig. 5 is another cross sectional view on line 5 of Figs. 2 and 3.

Referring to the drawing the parts marked A and B represent the two ends of the belt, 10 the plate and 20 the rivets by which the said two ends are joined together. The plate is provided with a series of openings 11, said openings being provided with opposite flat sides 12 and opposite rounded sides 13, the distance between the sides 12 being preferably less than the distance between the rounded sides or ends 13. The rivet is provided with a beveled head 21 and the shank 22. The shank is bifurcated to form the two legs 23. The outer surface of these legs and the shank of the rivet under the head is provided with flat sides 24 and rounded ends 25, which correspond respectively with the flat sides and rounded ends of the openings 11 in the plate 10. The outer ends or prongs of the rivet are so separated that in inserting the rivets they fit tightly against the sides 12 of the openings and are held in position in the plate before they are driven through the belt. The flat sides of the openings in the plate and of the rivet are so located that the prongs of the rivets when bent and clenched will lie transversely of the belt. It is to be understood, of course, that the head may be circular, or the head of the rivet, as shown in the drawing, may be elliptical instead of circular; and where the term "flat side" has been used, it is not to be understood that each flat side lies in a single plane, as it may be slightly curved.

Having now described my invention, what I claim as new and desire to secure by Letters Patent is:

1. In a device of the class described, a plate having openings therein, with flat opposing sides and rounded opposing sides, a rivet for each opening, said rivets having bifurcated ends, flat opposing sides and opposing rounded sides to closely fit the openings in said plate.

2. In a device of the class described, a belt having meeting ends, a plate extending over said meeting ends and provided with openings therein having flat opposing sides and rounded opposing sides, the distance between the flat sides being less than the distance between the rounded sides, bifurcated rivets for each opening, said rivets having flat opposing sides and rounded opposing sides, the solid portions of the shank closely fitting said openings, said openings being so arranged that the bifurcated ends of the rivets will lie transversely upon the belt.

3. In a device of the class described, a plate having openings therein, provided with opposing flat sides and opposing rounded sides, the distance between the flat sides being less than the distance between the rounded sides, a rivet for each opening having bifurcated prongs, the shank of the rivet having opposing flat sides and opposing rounded sides, the ends of the prongs of the rivet being adapted to be inserted in the said openings and held against the flat sides of the same, the said flat sides of the opening and the rivet being so located that the prongs of the rivet will stand transversely of the belt the solid portions of the shank closely fitting the openings.

In witness whereof I have hereunto set my hand at the borough of Manhattan, city and State of New York, this 26th day of August, 1912.

CLARA S. EATON.

In presence of—
H. N. DIKEMAN,
JOHN J. RANAGAN.